Patented Oct. 2, 1928.

1,686,393

UNITED STATES PATENT OFFICE.

KOKICHI OSHIMA, OF SAPPORO, JAPAN.

METHOD FOR PREVENTING THE BLACKENING OF TINNED FOODS.

No Drawing. Application filed February 19, 1927, Serial No. 169,679, and in Japan March 1, 1926.

This invention has reference to a method for preventing canned foods such as crabs, lobsters, sheel-fish, Indian corn and the like from turning black. Briefly stated, the process consists in the modulation of the hydrogen ion concentration by the addition of a weak-acid such as acetic acid, tartaric acid, phosphoric acid, carbonic acid, etc., or the alkali salt of such an acid, or an alkali solution, or by the addition of the impure solution containing such (for example, seawater or addition products of a part of above acids to impure table salt).

It is already known that the blackening of a tinned-food is due to the fact that, when the tinned meat is decomposed by microorganism, hydrogen sulphide may be isolated from the amino acid containing sulphur viz, cystin, which is a component of the tinned meat albumin, and simultaneously, the solution may acquire a basic condition by the formation of a basic substance, such as ammonia, with the result that iron sulphide may be produced by the action of the decomposed sulphide on the iron of the can.

According to my investigations, the hydrogen ion concentration of a safely tinned food is always pH 6 to 7, whereas that of a faulty product may be pH 7 to 8.5.

Heretofore it has been deemed necessary in order to prevent the formation of black substance in a tinned food, either to lacquer the interior of the can or to add a salt of tartaric acid etc. in order to neutralize the base produced in tinned food. However the former method cannot be relied upon and the latter method is difficult because of the difficulty in determining the quantity of the salt to be added since an excess would be objectionable.

I have succeeded in preventing the blackening of the tinned food by regulating the hydrogen ion concentration thereof (pH between 7 and 4) by adding a buffer solution or regulating mixture (especially a mixture of a weak acid and its alkali salt) to the tinned food.

Example.

A small quantity of sodium chloride (common table salt) and 10 c. c. of a mixture of 1,000 c. c. of sodium acetate solution containing one gram molecule per liter and about 400 c. c. of acetic acid solution containing one gram molecule per liter, are added to the paralithodes flesh (crab flesh) in the proportion of 0.5 lb. of such mixture to a half-pound can of such flesh.

The hydrogen ion concentration of the mixture of acetic acid and sodium acetate is nearly pH 5, but, after addition of the above mixture to crabs and heating, the hydrogen iron concentration of the liquid is pH 6.

The can is then closed in known manner, treated in an exhaust steam box for 10 minutes, then sealed, and finally sterilized for 40 minutes under 4 pounds steam pressure.

According to this invention, the hydrogen ion concentration of the buffer solution does not change by the addition of a sufficient quantity of acid or alkali. In view of these facts, by addition of such chemicals the acidity of the tinned food is not greatly increased, on the contrary the ability of the buffer solution to neutralize the base may be so great that the treated tinned food is protected against change in the basicity, and the blackening can be prevented for a long time, while the food retains its proper flavor or taste.

The acid reaction, which is maintained by the buffer solution, helps to sterilize the content of a can.

I claim:

1. A method which comprises adding to fish food to be canned, a regulating mixture capable of giving a hydrogen-ion content equal to pH 4 to 7, and thereafter canning and sterilizing.

2. A method which comprises adding to fish food to be canned, a regulating mixture comprising common salt, a weak organic acid and a salt of a weak organic acid, which mixture is capable of giving a hydrogen-ion content equal to pH 4 to 7, and thereafter canning and sterilizing.

3. A method which comprises adding to fish food to be canned, a regulating mixture comprising common salt, an organic acid and a salt of an organic acid, the latter two being in the molecular ratio of about 2.5 to 1, such mixture being capable of giving a hydrogen-ion content equal to pH 4 to 7, and thereafter canning and sterilizing.

In testimony whereof I affix my signature.

KOKICHI OSHIMA.